United States Patent [19]
Hogensen

[11] 3,850,446
[45] Nov. 26, 1974

[54] MOTOR VEHICLE SEAT BELT APPARATUS

[76] Inventor: Emory N. Hogensen, 13840 Edbrooke Ave., Riverdale, Ill. 60627

[22] Filed: May 10, 1971

[21] Appl. No.: 104,296

[52] U.S. Cl............................................ 280/150 SB
[51] Int. Cl............................................. B60r 21/00
[58] Field of Search.................... 280/150 SB, 150 B

[56] References Cited
UNITED STATES PATENTS

| | | | |
|---|---|---|---|
| 2,665,143 | 1/1954 | Rasmussen | 280/150 SB |
| 2,855,215 | 10/1958 | Sheren | 280/150 SB |
| 3,506,083 | 4/1970 | Botnick | 280/150 SB |
| 3,583,726 | 6/1971 | Lindblad | 280/150 SB |
| 3,618,975 | 11/1971 | Bombach | 280/150 SB |

FOREIGN PATENTS OR APPLICATIONS

| | | | |
|---|---|---|---|
| 1,918,427 | 11/1969 | Germany | 280/150 SB |

*Primary Examiner*—Leo Friaglia

[57] ABSTRACT

The invention relates to a motor vehicle seat belt having one end connected to a vehicle floor rearwardly of the seat and its opposite end connected to the swingable end portion of a swingable arm pivotally mounted on the inner side of a front hinged vehicle side door adjacent the vehicle seat whereby when the door is swung from a closed to an open position the seat belt and a shoulder strap having one end connected to an intermediate portion of the seat belt the opposite end of the strap attached to the vehicle roof above and to the rear of the seat back are shifted by means of the arm, and a recess on the sill of the vehicle door, from an occupant body restraining position to a forward elevated position away from occupant to permit convenient passage between the open door and seat.

9 Claims, 5 Drawing Figures

PATENTED NOV 26 1974  3,850,446

MOTOR VEHICLE SEAT BELT APPARATUS

This invention relates to a motor vehicle seat belt apparatus and has particular reference to means wherein a seat belt and shoulder strap may be arranged to fulfill their intended purpose with no need for manual arrangement or contact with the belt and strap or any part of the referred to apparatus, the aforesaid means provided by the apparatus and a vehicle door when the door, pivotally connected to the apparatus, is swung from an open to a closed door position.

Another object of the invention is to provide the seat belt and shoulder strap with means wherein they may shift from a closed to an open door position whereby a vehicle seat occupant provided with a belt, strap and an apparatus fulfilling their intended purpose may be freed from the seat belt and shoulder strap in order to vacate the seat and vehicle with no need for manual arrangement or contact with the seat belt, shoulder strap or the apparatus, after which the seat occupant may reenter the vehicle and reoccupy the referred to seat and by means of the apparatus and swinging the vehicle door from an open to a closed door position the seat occupant may be provided with a seat belt and shoulder strap fulfilling their intended purpose whereby the occupant may retain his seat to prevent injury resulting from a sudden stop or collision the referred to belt and strap purpose fulfilling arrangement provided with no need for manual arrangement or contact with the seat belt, shoulder strap or the apparatus.

Other objects of the invention and various advantages of the motor vehicle seat belt apparatus will be apparent from a consideration of the following detailed description, taken in conjunction with the accompanying drawings showing a preferred illustrative embodiment, in which.

Figure 1:
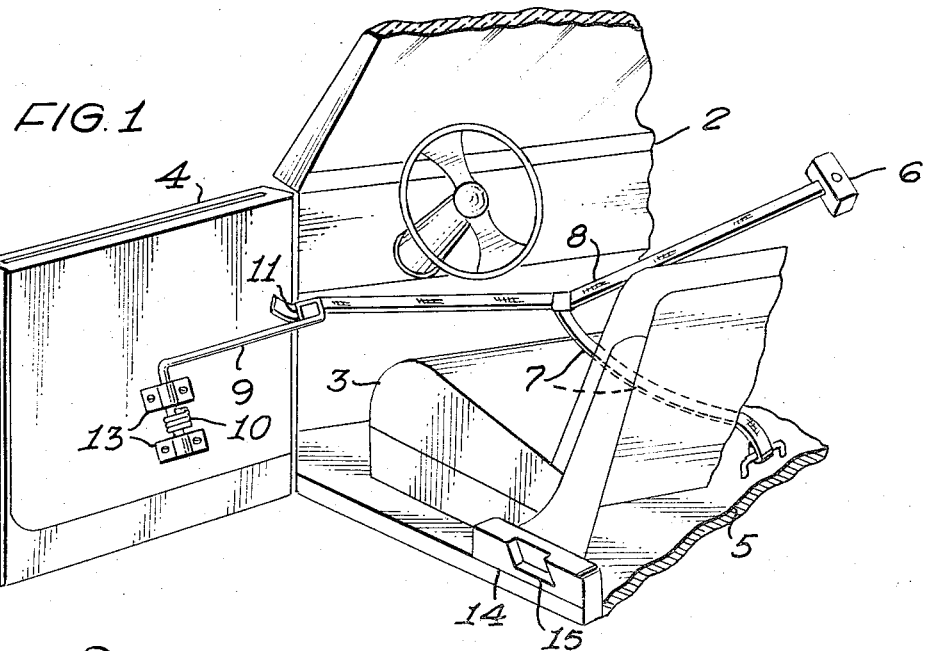
FIG. 1 is a perspective view showing the seat belt, shoulder strap and the apparatus in an open vehicle door position the vehicle having certain parts omitted and other parts broken away for the purpose of illustration.

Referring to the drawings, the reference numeral 2 indicates a conventional motor vehicle having certain parts omitted and other parts broken away for the purpose of illustration, the vehicle having a seat 3, door 4, floor 5, top 6, seat belt 7, fixedly connected to floor 5, and a shoulder strap 8, fixedly connected to top 6 and its opposite end attached to seat belt 7.

As shown the apparatus comprises an L-shaped arm which may be made of any suitable material but it is preferred to use a stainless steel rod type material, one end of arm 9 having a 90 degree angled end piece which is shown encircled and attached to a coil spring 10. A narrow continuation at the opposite end of arm 9 forms a buckle 11 whereby, when provided with a cross piece 12, seat belt 7 may be adjustably connected to arm 9 to provide a particular seat occupant with a permanent seat belt and shoulder strap adjustment. A pair of pivotal holders 13 are shown fixedly connected to the inner side of door 4 in a diagonal spaced apart position whereby arm 9 may be pivotally and diagonally mounted on door 4.

Figure 5:
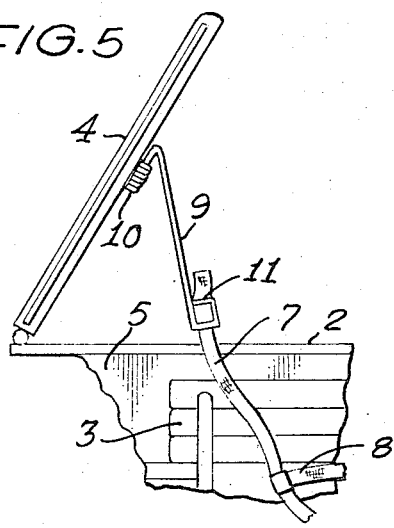
FIG. 5 is a fragmentary plan view showing an open vehicle door in combination with the arrangement of the pivotally door mounted apparatus.

In FIG. 1, the arrangement of seat belt 7 and shoulder strap 8 is shown in an open vehicle door position. In connection with the open door position shown in FIGS. 1 and 5, shoulder strap 8 is shown hanging downwardly and forwardly from its connection to top 6 to its connection with seat belt 7. Seat belt 7 is shown extending upwardly and forwardly from its connection to floor 5 to its connection with arm 9. Arm 9 is shown extending inwardly from its middoor 4 connection to its connection with seat belt 7, however, although seat belt 7, shoulder strap 8 and arm 9 have been shifted from the closed door purpose fulfilling arrangement shown in FIG. 2, the spring provided end portion of arm 9 has remained in the same diagonal position on the inner side of door 4. A flange 14 having a recess 15 adapted to interfit with an end portion of seat belt 7, arm 9, and buckle 11, is shown attached to the portion of the vehicle frame which is adjacent to vehicle seat 3.

Figure 2:
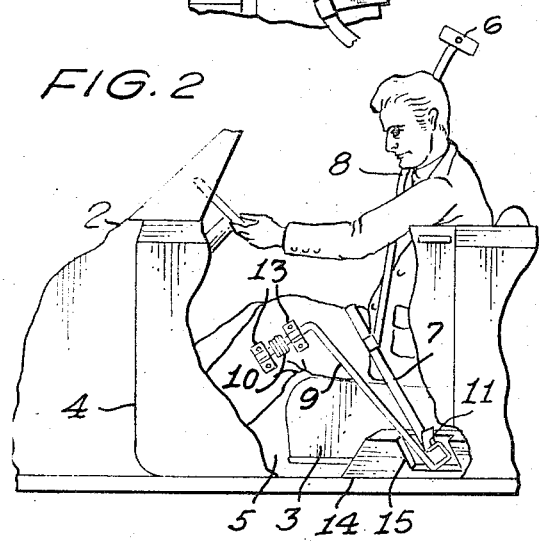
FIG. 2 is a view, similar to FIG. 1, showing a seat belt apparatus in a purpose fulfilling closed door arrangement, the door having certain parts broken away for the purpose of illustration.

To provide seat belt 7 and shoulder strap 8 with means to shift from the closed door purpose fulfilling arrangement shown in FIG. 2 to the seat belt 7 and shoulder strap 8 vehicle entrance and seat occupying free arrangement shown in FIG. 1 vehicle door 4 is swung from a closed to an open door position. In connection with outwardly and forwardly swinging movement of door 4, pivotal holders 13 provide the angled end piece of arm 9 with means to rotate whereby in conjunction with the outwardly pulling force of seat belt 7 provided by door 4, arm 9, seat belt 7 and shoulder strap 8 are swung outwardly and diagonally upwardly and forwardly to be provided with the arrangement shown in FIGS. 1 and 5 by means of which the seat occupant may be free of seat belt 7 and shoulder strap 8 in order to vacate vehicle seat 3 and vehicle 2 or reenter the vehicle and reoccupy the seat with no need for manual arrangement or manual contact with seat belt 7, shoulder strap 8 or any part of the apparatus. In a vacant closed door position belt 7 lies on seat 3.

It should be noted in a vehicle accident resulting in a fire the seat occupant may be free of the seat belt and shoulder strap by opening the vehicle door.

Figure 4:
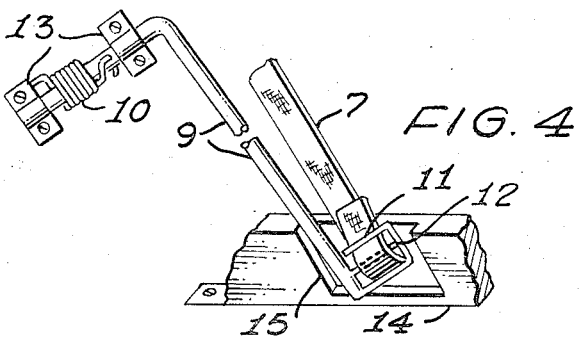
FIG. 4 is a detail view of the apparatus.
Figure 3:
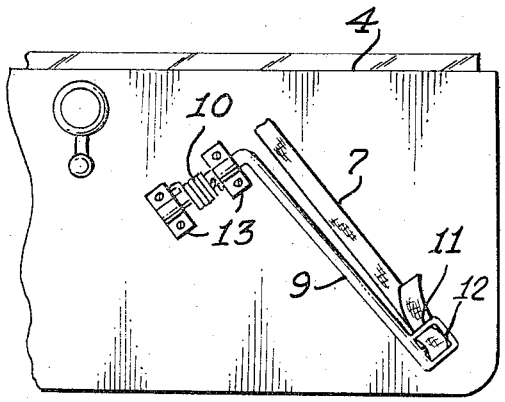
FIG. 3 is a view from the right side of a motor vehicle showing the seat belt apparatus pivotally mounted on the opposite vehicle door.

As shown in FIGS. 3 and 4, the aforementioned coil spring 10 is provided with a fixed connection to door 4 after which the opposite end is turned clockwise till spring 10 has been provided with sufficient tension to be capable of providing the angled end piece of arm 9 with a rearwardly rotating movement after which the free end of coil spring 10 is passed through a hole in the aforesaid end piece to be bent and provide spring 10 with a fixed connection to the angled end piece of arm 9. By means of the fixed connection of spring 10 to door 4 and the angled end piece of arm 9 the aforesaid end piece is continuously urged to rotate rearwardly whereby arm 9 and seat belt 7 are swung diagonally downwardly and rearwardly and, in relation to door 4, inwardly, however, when door 4 is swung rearwardly and inwardly from the open position shown in FIG. 1 to the closed position shown in FIG. 2 buckle 11 in conjunction with end portions of arm 9 and seat belt 7 are swung inwardly to be provided with an interfitted relationship with flange 14 by means of recess 15, whereby seat belt 7 is provided with readily releasable interlocking means consisting of a flush interlocked juxtaposed side to side relationship with flange 14 and door 4, which is maintained till door 4 is swung to an open position, whereby arm 9 serves to fold seat belt 7 upwardly after which seat belt 7 extendes across the hips and waist of the seat 3 occupant to its fixed connection with floor 5 while shoulder strap 8 extends from its connection to seat belt 7 at the waist of the seat occupant and over the shoulder to its fixed connection with top 6 to provide seat belt 7 and shoulder strap 8 with an arrangement which fulfills their intended purpose whereby a vehicle seat occupant may retain his seat to prevent injury resulting from a sudden stop or collision the referred to arrangement provided with no need for manual arrangement or contact with seat belt 7, shoulder strap 8 or any part of the herein described apparatus.

I claim:

1. The combination of a vehicle having a front hinged side door adjacent the vehicle seat and a seat belt apparatus comprising an arm having an angled end piece, means pivotally mounting said end piece on the inner side of said door for pivoting about an axis extending upwardly and rearwardly in the vertical plane of the door such that the free portion of said arm at an angle of said end piece is swingable about said axis toward and away from the door, spring means biasing said free arm portion downwardly against said door, a buckle connected to the outer end of said swingable arm portion; a seat belt connected at one end thereof to said buckle and at its opposite end to the floor rearwardly of the seat, a shoulder strap attached at one end to the vehicle roof above and to the rear of the seat back, the opposite end of said strap attached to an intermediate portion of the seat belt, a recess on the door sill for receiving said arm outer end when said arm is against the door in the closed position thereof so that the door overlies said arm end in the recess and thereby serves as a releasable arm locking means whereby when the door is swung from a closed to an open position said seat belt and shoulder strap are shifted by the upward rotation of said swingable arm portion from an occupant body restraining position to a forward elevated position away from the occupant to permit convenient passage between open door and seat.

2. The combination of a vehicle having a front hinged side door adjacent the vehicle seat and a seat belt apparatus comprising an arm having an angled end piece, means pivotally mounting said end piece on the inner side of said door for pivoting about an axis extending upwardly and rearwardly in the vertical plane of the door such that the free portion of said arm at an angle of said end piece is swingable about said axis toward and away from the door, spring means biasing said free arm portion downwardly against said door, a seat belt connected at one end thereof to the outer end of said swingable arm portion and at its opposite end to the floor rearwardly of the seat, a recess on the door sill for receving said arm outer end when said arm is against the door in the closed position thereof so that the door overlies said arm end in the recess and thereby serves as a releasable arm locking means whereby when the door is swung from a closed to an open position said seat belt is shifted by the upward rotation of said swingable arm portion from an occupant body restraining position to a forward elevated position away from the occupant to permit convenient passage between open door and seat.

3. The combination of a vehicle having a front hinged side door adjacent the vehicle seat and a seat belt apparatus comprising an arm having an angled end piece, means pivotally mounting said end piece on the inner side of said door for pivoting about an axis extending upwardly and rearwardly in the vertical plane of the door such that the free portion of said arm at an angle of said end piece is swingable about said axis toward and away from the door, spring means biasing said free arm portion downwardly against said door, a seat belt connected at one end thereof to the outer end of said swingable arm portion and at its opposite end to the floor rearwardly of the seat whereby said arm facilitates the closed and open door position of said seat belt, by rotation of said arm.

4. In a seat belt apparatus for a vehicle having a front hinged side door adjacent a seat, mechanism for positioning an end of a safety belt relative to the door and seat, said mechanism including an elongated arm having an angled end portion pivotally mountable on the inner side of the door such that the arm is swingable toward and away from said door, spring means biasing said arm downwardly against the door, the free end portion of said arm having means for securing an end of the seat belt, whereby movement of the arm actuates the end of the seat belt towards and away from the door and seat.

5. The combination of a vehicle having a front hinged side door adjacent the vehicle seat and a seat belt apparatus comprising an arm having an angled end piece, means pivotally mounting said end piece on the inner side of said door for pivoting about an axis extending upwardly and rearwardly in the vertical plane of the door such that the free portion of said arm at an angle of said end piece is swingable about said axis toward and away from the door, means constantly biasing said arm towards the door said arm having a buckle shaped end piece at the outer end of said swingable arm portion and a seat belt removably connected at one end thereof to said buckle shaped end piece and at its opposite end to the floor rearwardly of the seat.

6. The combination of a vehicle having a front hinged side door adjacent the vehicle seat and a seat belt apparatus comprising an arm having an angled end piece, means pivotally mounting said end piece on the inner side of said door for pivoting about an axis extending upwardly and rearwardly in the vertical plane of the door such that the free portion of said arm at an angle of said end piece is swingable about said axis toward and away from the door, spring means biasing said free arm portion downwardly against said door, a seat belt connected to the outer end of said swingable arm portion and at its opposite end to the floor rearwardly of the seat, a shoulder strap attached at one end to the vehicle roof above and to the rear of the seat back, the opposite end of said strap attached to an intermediate portion of the seat belt whereby the rotation of said arm facilitates the synchronized arrangement of said seat belt and shoulder strap from an open to a closed door position and a closed to an open position.

7. The combination of claim 1, wherein said buckle comprises a buckle shaped end piece at the outer end portion of said swingable arm portion, said buckle having means whereby the free end portion of said seat belt may be inserted and secured in said buckle in order to provide a seat occupant with a permanent or temporary seat belt adjustment.

8. The combination of claim 1, wherein said recess is formed in a flange of the door sill for receiving said arm outer end when said arm is against the door in the closed position thereof so that the door overlies said arm end in the recess, on the sill of the door, and thereby serves as a releasable arm locking means.

9. The combination of claim 1, wherein said spring means comprises: a spring connected to the door at one end and to the swingable arm at its opposite end to bias said arm portion downwardly against said door.

* * * * *